United States Patent [19]

Ishiwata

[11] Patent Number: 5,454,920

[45] Date of Patent: Oct. 3, 1995

[54] SPUTTERING METHOD AND APPARATUS FOR OPTIMUM SATURATION MAGNETOSTRICTION

[75] Inventor: Nobuyuki Ishiwata, Tokyo, Japan

[73] Assignee: NEC Corporation, Tokyo, Japan

[21] Appl. No.: 614

[22] Filed: Jan. 5, 1993

[30] Foreign Application Priority Data

Jan. 13, 1992 [JP] Japan ................................... 4-003445

[51] Int. Cl.⁶ ................................................. C23C 14/54
[52] U.S. Cl. .............................. 204/192.13; 204/192.15; 204/192.2; 204/298.03; 204/298.07; 204/298.08
[58] Field of Search ........................ 204/192.15, 192.13, 204/192.2, 298.03, 298.13, 298.07, 298.08

[56] References Cited

U.S. PATENT DOCUMENTS

| 4,166,783 | 9/1979 | Turner et al. | 204/192.13 |
| 4,846,948 | 7/1989 | Saito et al. | 204/192.2 |

FOREIGN PATENT DOCUMENTS

| 3613112 | 10/1987 | Germany | 204/298.03 |
| 1-309306 | 12/1989 | Japan | 204/192.2 |

OTHER PUBLICATIONS

Shibaya et al., IEEE Transactions on Magnetics, vol. Mag 13, No. 4, Jul. 1977 "Preparation by Sputtering of Thick Sendust Film Suited for Recording Head Core" pp. 1029–1035.

Serikawa, Review of the Electrical Communication Laboratories vol. 25, Nos. 3–4, Mar.–Apr. 1977 "Permalloy Film Preparation by RF Sputtering" pp. 209–216.

"Magnetic Properties of Fe–Si–Al Sputtered Films", Japan Applied Magnetics Society Trans., vol. 11, No. 2, 1987 by M. Takahashi et al., pp. 299–302.

Primary Examiner—R. Bruce Breneman
Assistant Examiner—Rodney G. McDonald
Attorney, Agent, or Firm—Young & Thompson

[57] ABSTRACT

When depositing an alloy film on a substrate by sputtering, a thickness of the deposited alloy film is measured and accumulated with respect to one alloy target. A sputtering power or a sputtering gas pressure is calculated in accordance with a predetermined equation defining a desired saturation magnetostriction using the accumulated thickness. Thus, the sputtering power or sputtering gas pressure is controlled to obtain the desired saturation magnetostriction.

36 Claims, 15 Drawing Sheets

5,454,920

SPUTTERING METHOD AND APPARATUS FOR OPTIMUM SATURATION MAGNETOSTRICTION

BACKGROUND OF THE INVENTION

1. Field of the Invention

The present invention relates to a sputtering system, and more particularly, to a method and apparatus for depositing an alloy film by sputtering such as DC magnetron sputtering of a Fe—Si—Al alloy or the like.

2. Description of the Related Art

Generally, in a highvision or high quality video tape recoder(VTR), a laminated-type head comprised of a magnetic core made of a soft magnetic material having a large saturation magnetization has been provided to ensure a high density for magnetic writing and reading operations. Also, as such a soft magnetic material, a Fe—Si—Al alloy material, which is called "sendust", has been used.

Since the saturation magnetostriction ($\lambda_s$) of the sendust strongly affects the efficiency of the head, it is important to set the saturation magnetostriction at an optimum value around zero, for example.

In a prior art sputtering system, since the saturation magnetostriction of the sendust is dependent upon the compositions thereof, particularly, the Si composition, the compositions of a sendust target are changed to obtain an optimum saturation magnetostriction (see: M. Takahashi et al., "Magnetic Properties of Fe—Si—Al Sputtered Films", Japan Applied Magnetics Society Trans., Vol. 11, No. 2, 1987, pp. 299–302).

In the prior art sputtering system, however, even if the compositions of a sendust target are suitably changed, the saturation magnetostriction of a deposit alloy film is changed depending on the period of use of the alloy target, which will be explained in detail later.

SUMMARY OF THE INVENTION

It is an object of the present invention to provide a sputtering method and apparatus for an optimum saturation magnetostriction without changing the compositions of an alloy target.

According to the present invention, when depositing an alloy film on a substrate by sputtering, a thickness of the deposited alloy film is measured and accumulated with respect to one alloy target. Then, a sputtering power or a sputtering gas pressure is calculated in accordance with a predetermined equation defining a desired saturation magnetostriction using the accumulated thickness. Thus, the sputtering power or sputtering gas pressure is controlled to obtain the desired saturation magnetostriction.

BRIEF DESCRIPTION OF THE DRAWINGS

The present invention will be more clearly understood from the description as set forth below, compared with the prior art, with reference to the accompanying drawings, wherein.

DESCRIPTION OF THE PREFERRED EMBODIMENTS

Figure 1:
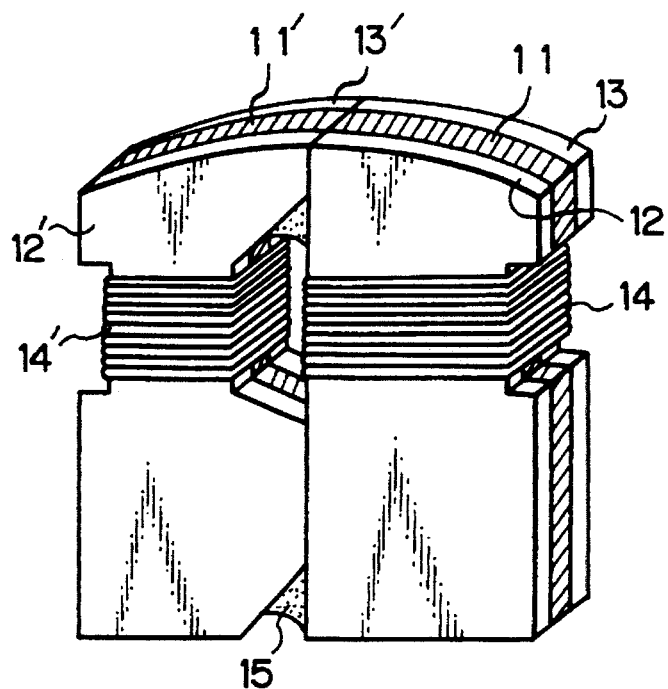
FIG. 1 is a perspective view illustrating a laminated-type head in a VTR.

In FIG. 1, which illustrates a laminated-type head used in a highvision VTR, reference numeral 11(11') designates a soft magnetic film as a magnetic core sandwiched by two reinforced members 12 and 13(12' and 13') made of ceramic or the like. A winding 14 is wound on an assembly formed by the soft magnetic film 11 and the reinforced members 12 and 13, and winding 14' is wound on an assembly formed by the soft magnetic film 11' and the reinforced members 12' and 13'. The two assemblies are bonded to each other by glass adhesives 15.

Figure 2:
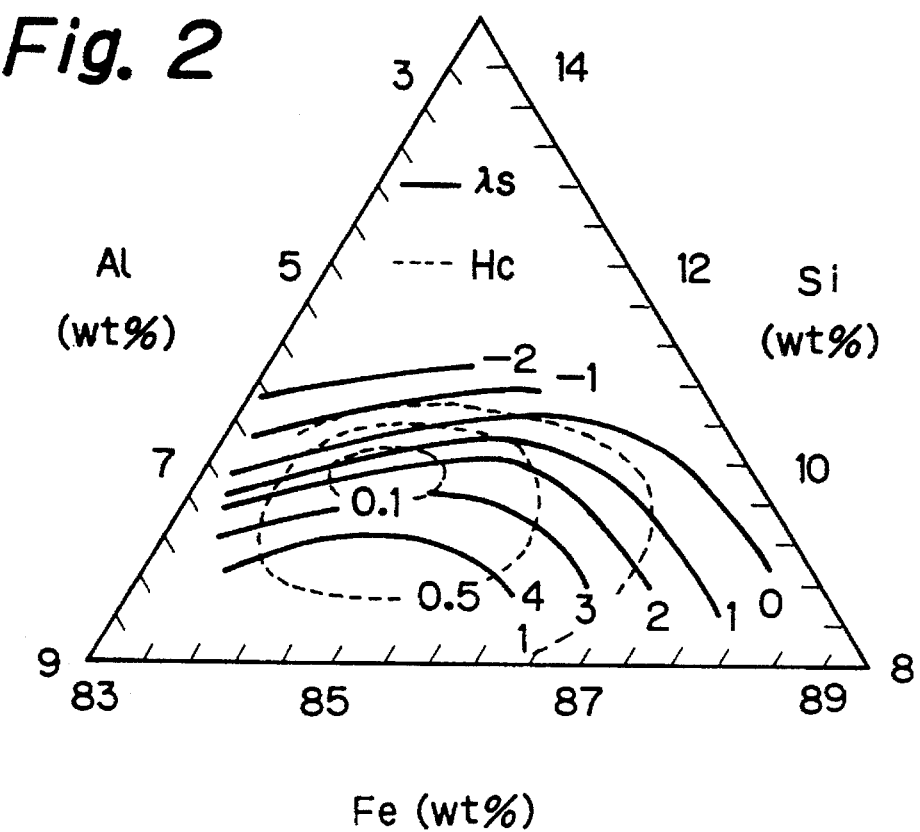
FIG. 2 is a diagram showing coercive force and saturation magnetostriction characteristics of a Fe—Si—Al alloy (sendust)

As explained above, the soft magnetic films 11 and 11' have a large saturation magnetization and are made of sendust (Fe—Si—Al alloy). As the coercive force Hc and saturation magnetostriction $\lambda_s$ of sendust is as shown in FIG. 2, when the coercive force Hc is less than $0.5Oe(=\frac{1}{8}\pi \times 10^3$ A/m) and the Al composition of sendust is 5 to 7%, the saturation magnetostriction $\lambda_s$ is linearly changed depending on the Si composition. Therefore, an optimum saturation magnetostriction $\lambda_s$ can be obtained by changing the Si composition of sendust (see: the above-mentioned document). However, the saturation magnetostriction $\lambda_s$ is changed depending on the period of use of a sendust target, which is explained below with reference to FIGS. 3A and 3B which illustrate a part of a DC magnetron sputtering apparatus.

Figure 3A:
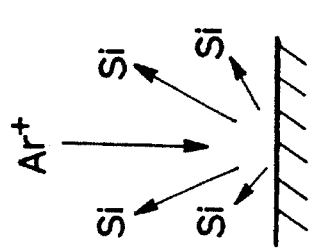
FIGS. 3A and 3B are diagrams for explaining the change of the saturation magnetostriction characteristic with respect to one alloy target.
Figure 3A:
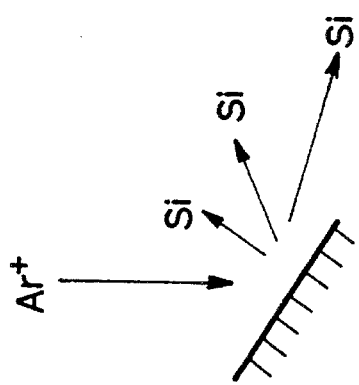
Figure 3A:
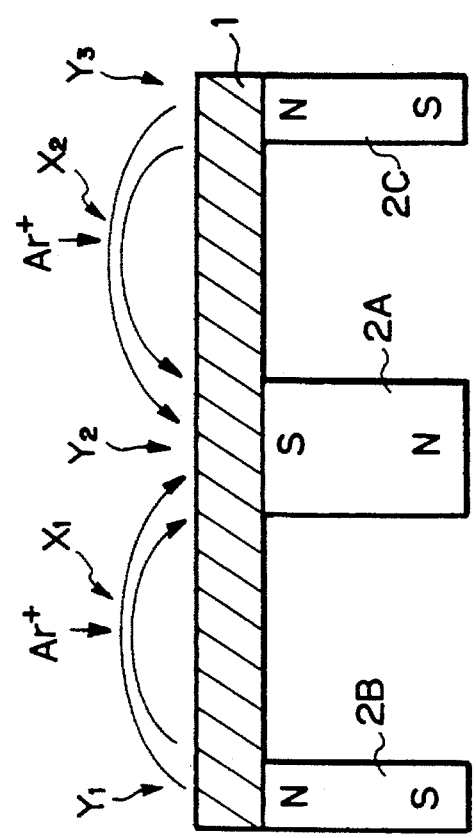
Figure 3B:
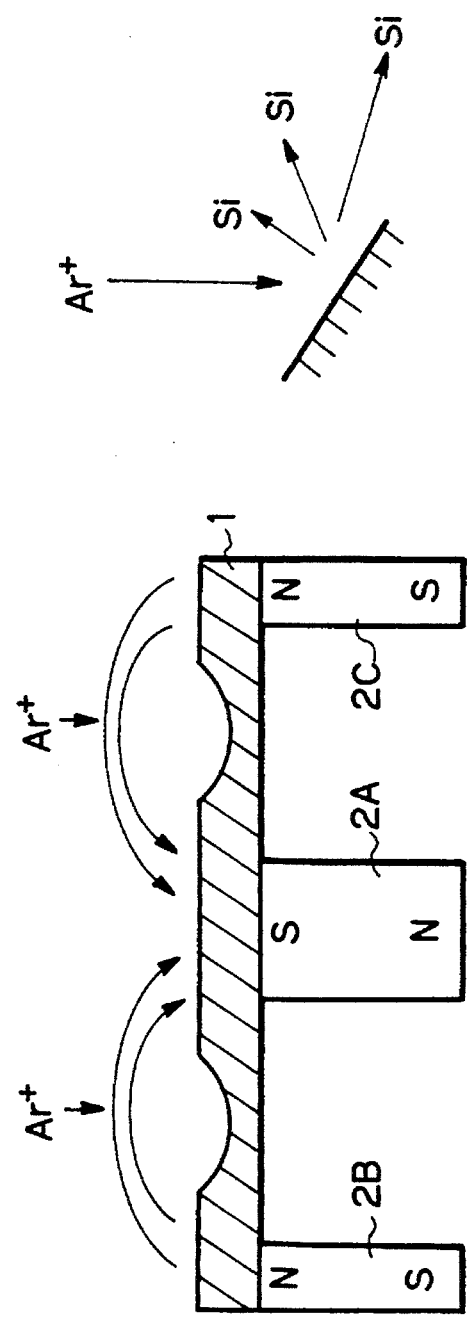

As illustrated in FIG. 3A, if a sendust target 1 is new, magnetic flux lines indicated by long arrows are generated by permanent magnets 2A, 2B and 2C. In this case, the magnetic flux density at locations $X_1$ and $X_2$ is larger than that at locations $Y_1$, $Y_2$ and $Y_3$, and as a result, sputtering gas ions($Ar^+$) are focused on the locations $X_1$ and $X_2$. Therefore, if a sputtering process is continued for this sendust target 1, the sendust target 1 is eroded as illustrated in FIG. 3B. As a result, the distribution of sputtered atoms such as Si is changed due to the change of an angle of the acceleration direction of the sputtering gas($Ar^+$) with respect to a face of the sendust target 1. Note that the distribution of sputtered Si atoms is different from that of sputtered Al atoms and that of sputtered Fe atoms, therefore, if a sputtering process is continued for the sendust target 1, the compositions of deposited films are changed to thereby change the saturation magnetostriction of the deposited films.

Figure 4A:
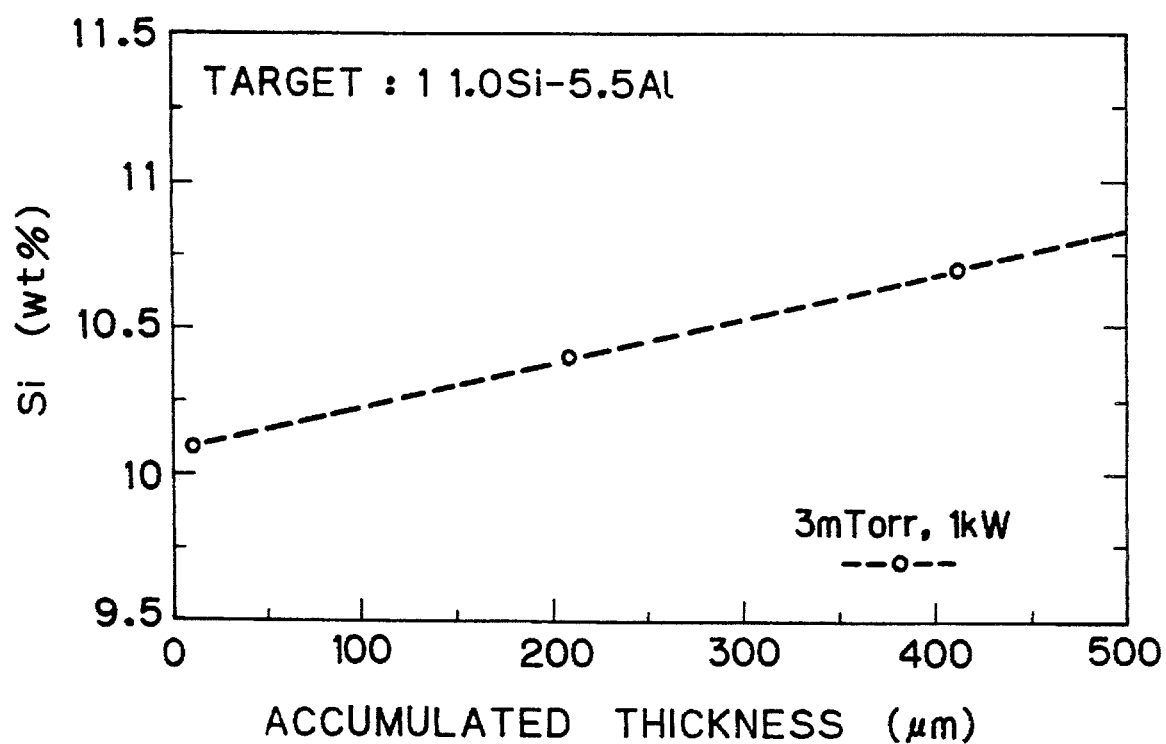
FIG. 4A is a graph showing a relationship between an accumulated thickness of sendust-sputtered films and the Si composition of a sendust-sputtered film.
Figure 4B:
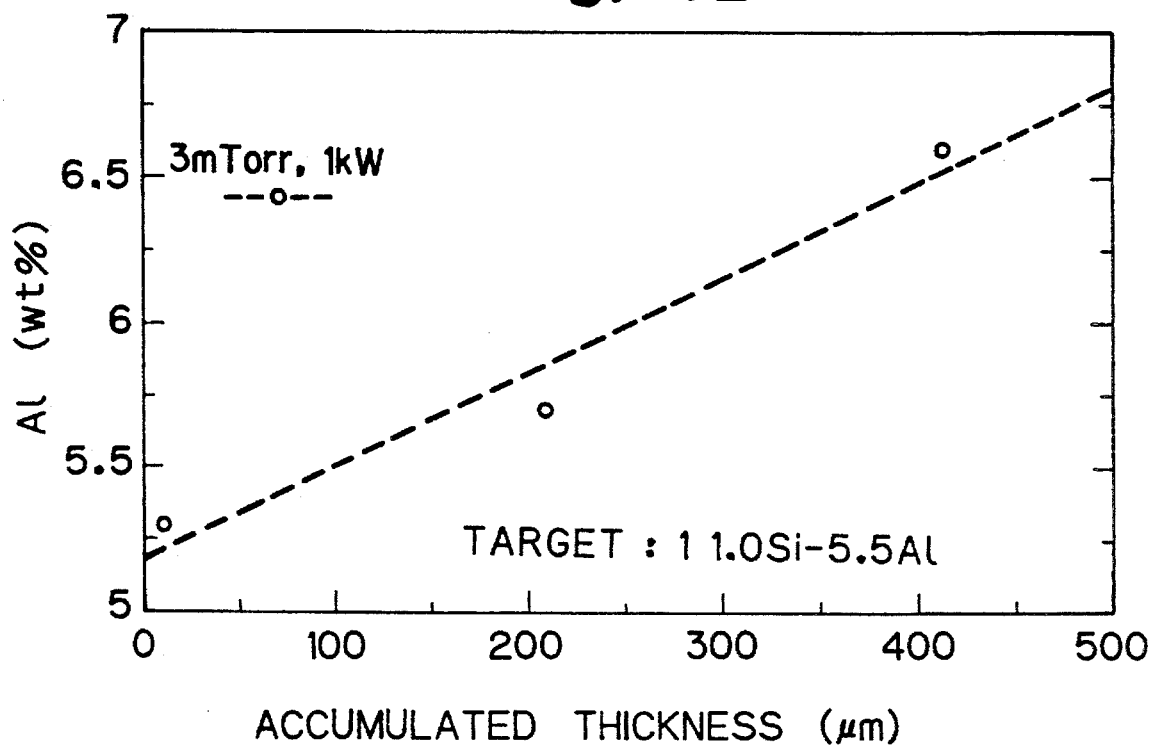
FIG. 4B is a graph showing a relationship between an accumulated thickness of sendust-sputtered films and the Al composition of a sendust-sputtered film.
Figure 4C:
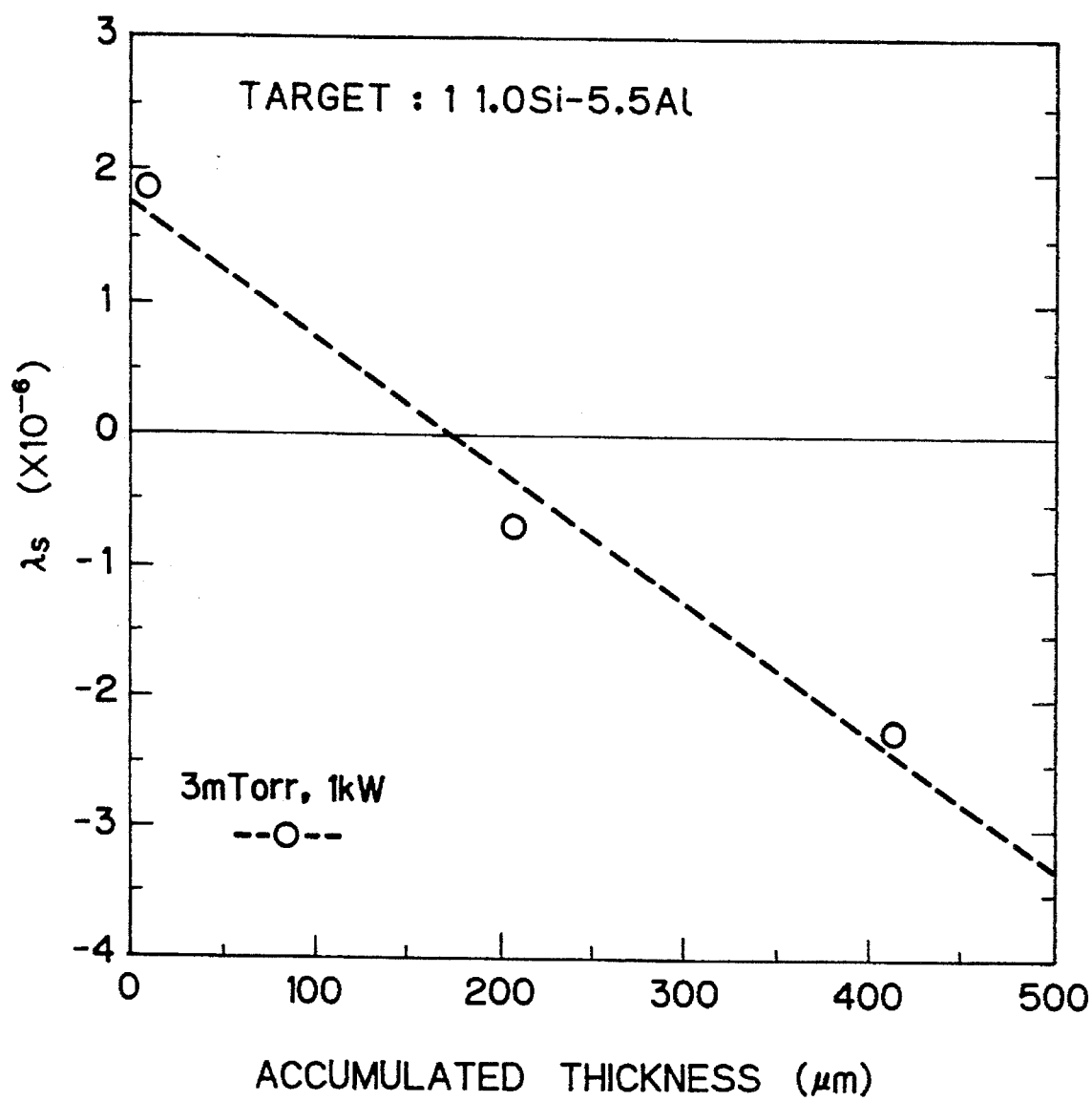
FIG. 4C is a graph showing a relationship between an accumulated thickness of sendust-sputtered films and the saturation magnetostriction of a sendust-sputtered film.
Figure 7:
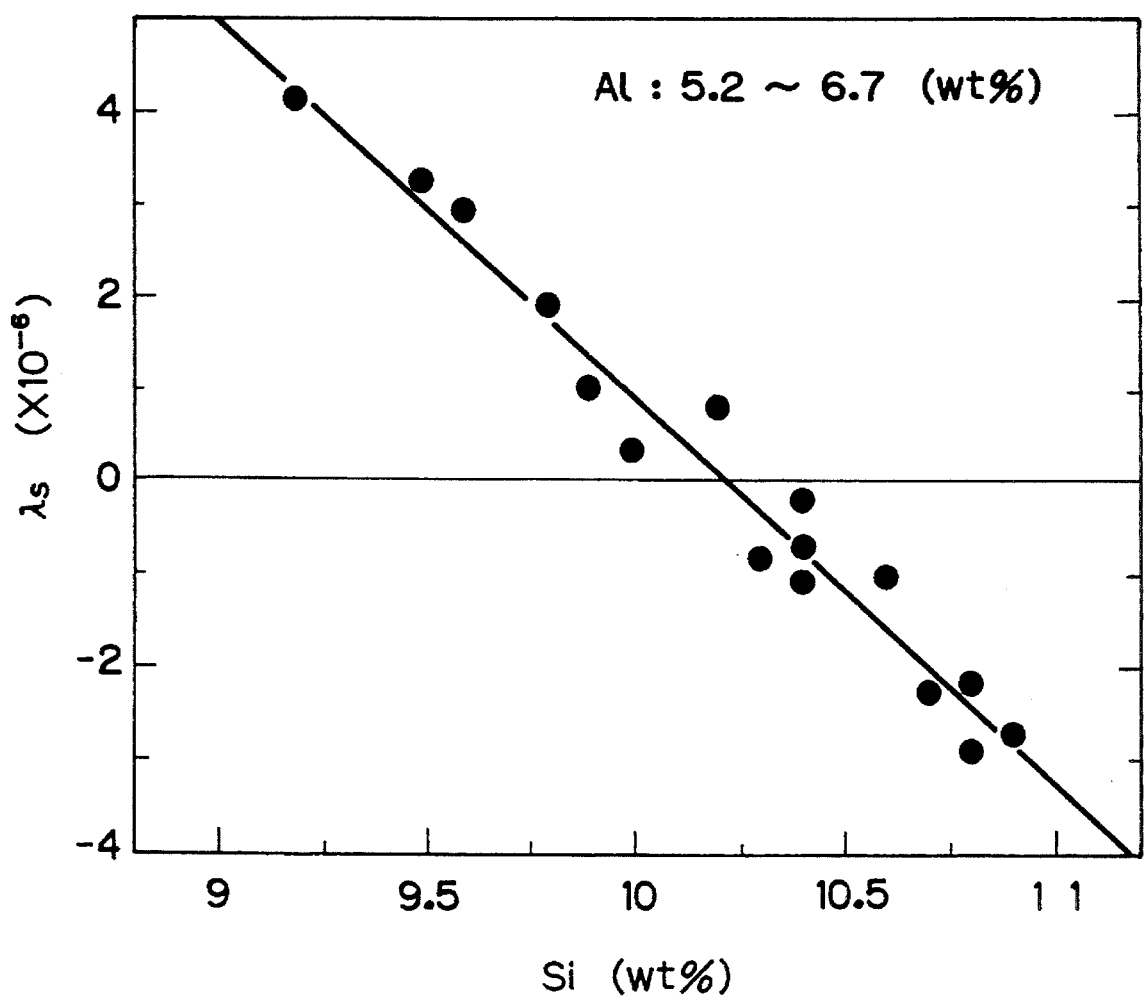
FIG. 7 is a graph showing a relationship between the Si composition of a sendust-sputtered film and the saturation magnetostriction of a sendust-sputtered film.

In view of the foregoing, the present inventor recognized that the saturation magnetostriction $\lambda_s$ of each film is dependent upon the accumulated thickness of sendust-sputtered films with respect to one sendust target, i.e., the period of use thereof. That is, as shown in FIGS. 4A and 4B where the sputtering gas(Ar) pressure PR is 3 mTorr and the sputtering power PW is 1 KW, when the accumulated thickness of sendust-sputtered films is increased, the Si composition and Al composition of a film deposited by sputtering is linearly increased. As a result, as shown in FIG. 4C, the saturation magnetostriction $\lambda_s$ of a film deposited by sputtering is linearly increased due to the characteristics as shown in FIG. 2. Note that, as shown in FIG. 2, when the saturation magnetostriction $\lambda_s$ is changed from a positive value to a negative value in the range of Al from 5 wt % to 7 wt %, this change of the saturation magnetostriction $\lambda_s$ is mainly due to the change of the Si composition. This phenomenon is shown in FIG. 7.

Figure 5A:
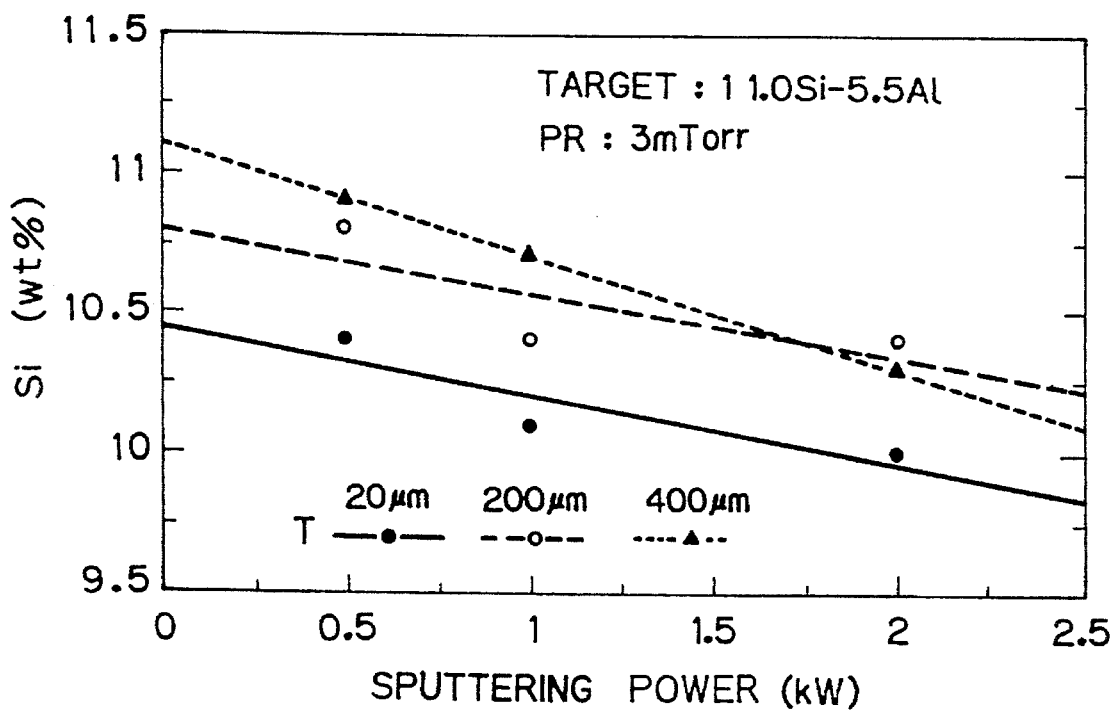
FIG. 5A is a graph showing a relationship between a sputtering power and the Si composition of a sendust-sputtered film.
Figure 5B:
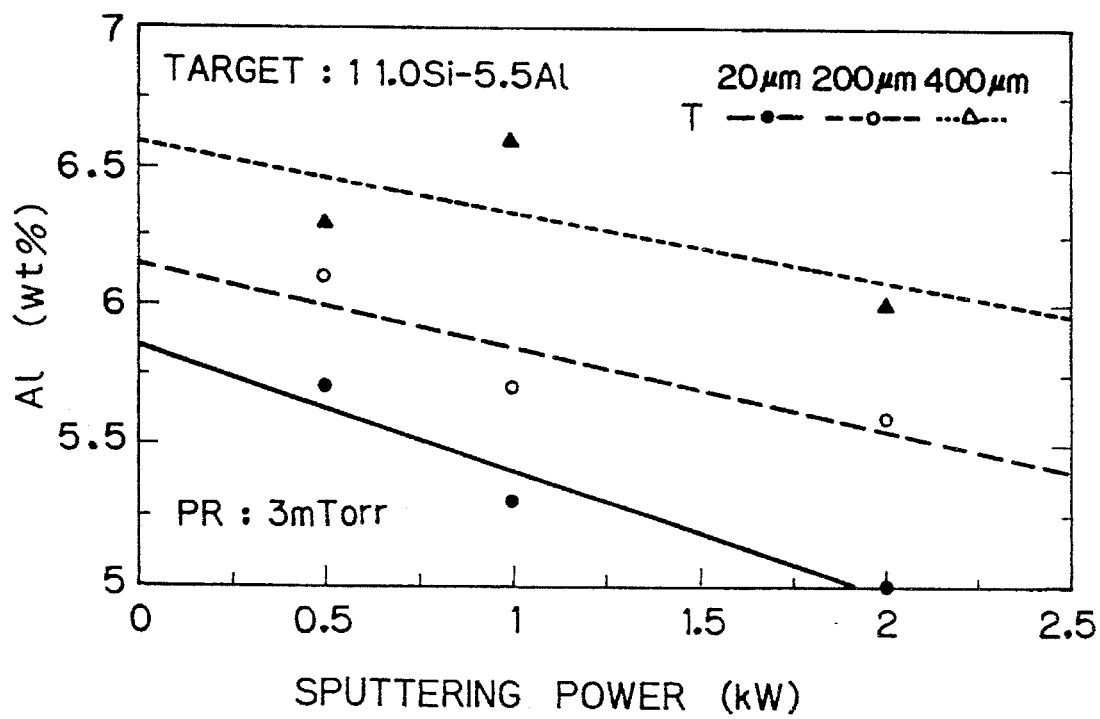
FIG. 5B is a graph showing a relationship between a sputtering power and the Al composition of a sendust-sputtered film.
Figure 5C:
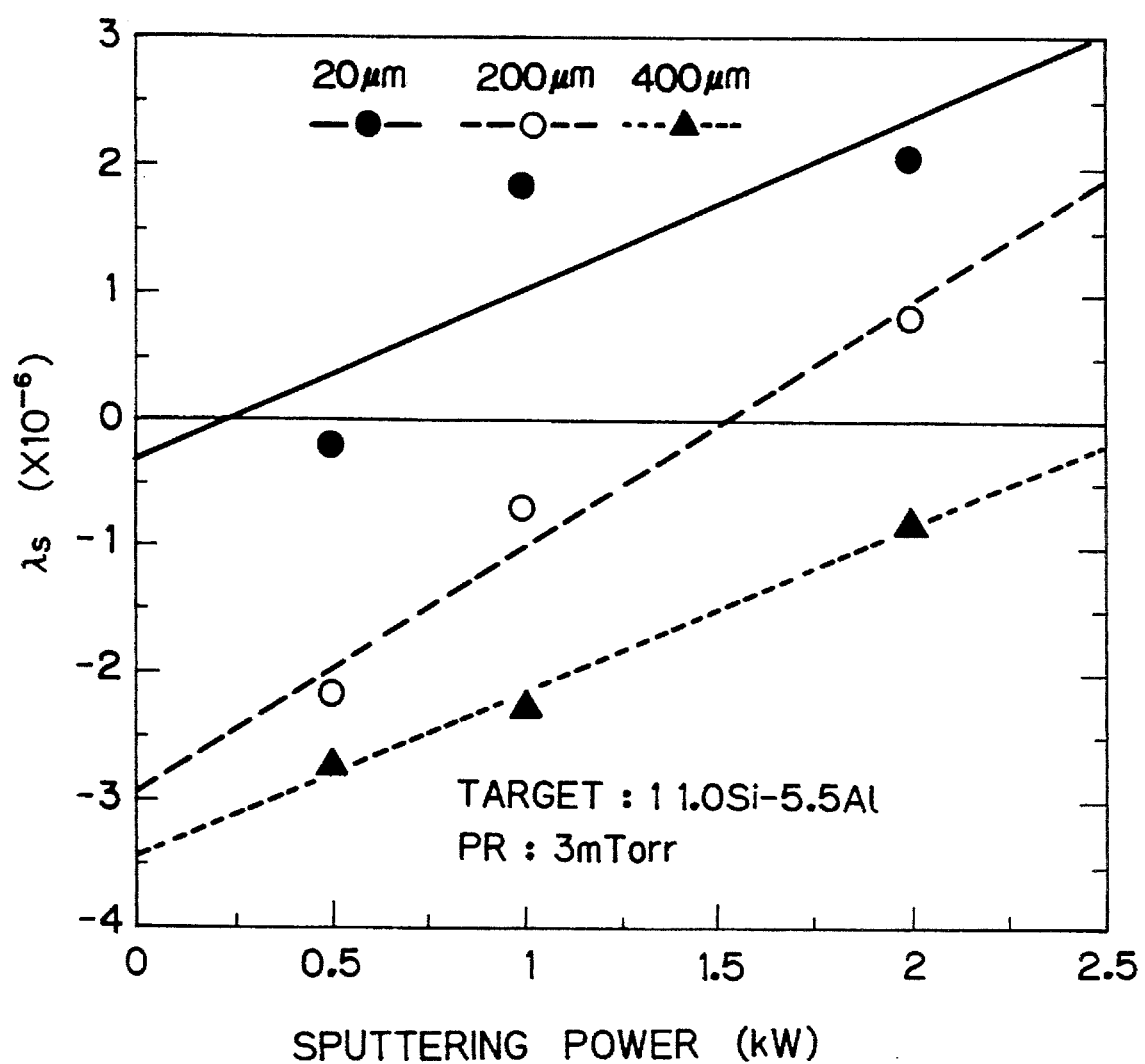
FIG. 5C is a graph showing a relationship between a sputtering power and the saturation magnetostriction of a sendust-sputtered film.

Also, the inventor recognized that the saturation magnetostriction $\lambda_s$ of each film is dependent upon a sputtering power PW. That is, as shown in FIGS. 5A and 5B where the sputtering gas(Ar) pressure PR is 3 mTorr, and the accumulated thickness T is 20 μm, 200 μm and 400 μm, when the sputtering power PW is increased, the Si composition and Al composition of a film deposited by sputtering is linearly or logarithmically increased. As a result, as shown in FIG. 5C, the saturation magnetostriction $\lambda_s$ of a film deposited by sputtering is linearly or logarithmically decreased due to the characteristics as shown in FIG. 2. Note that, as also shown in FIG. 2, when the saturation magnetostriction $\lambda_s$ is changed from a positive value to a negative value in the range of Al from 5 wt % to 7 wt %, this change of the saturation magnetostriction $\lambda_s$ is mainly due to the change of the Si composition. This phenomenon is shown in FIG. 7.

Figure 6A:
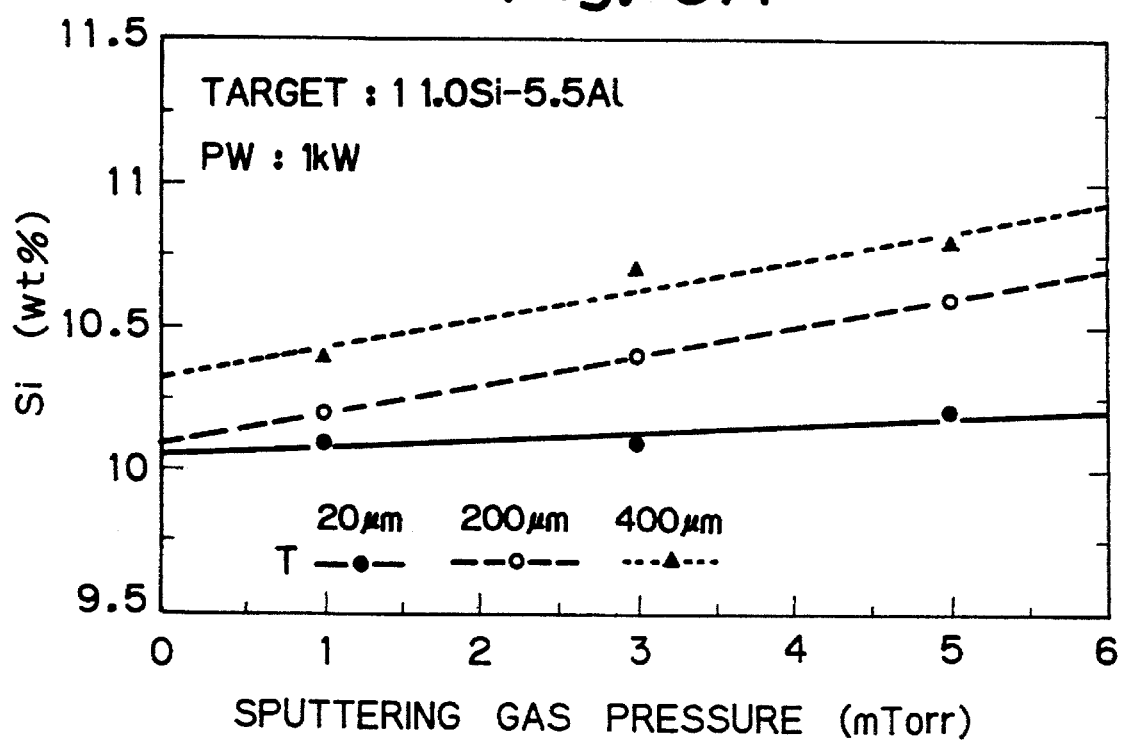
FIG. 6A is a graph showing a relationship between a sputtering gas pressure and the Si composition of a sendust-sputtered film.
Figure 6B:
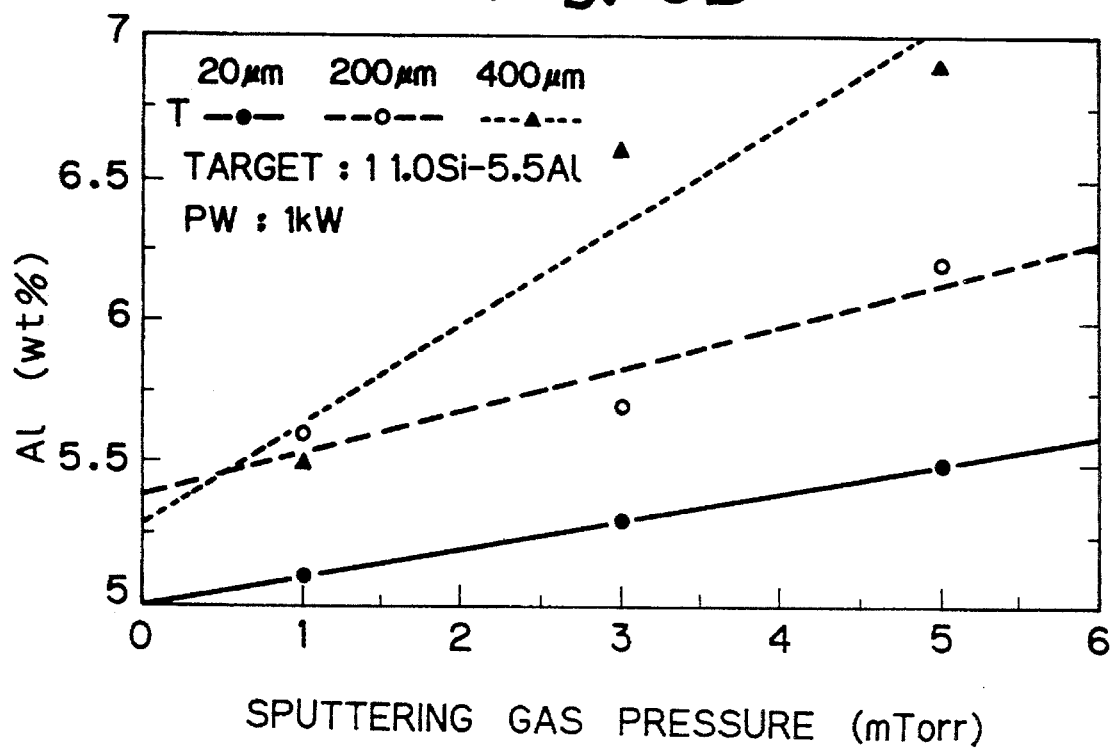
FIG. 6B is a graph showing a relationship between a sputtering gas pressure and the Al composition of a sendust-sputtered film.
Figure 6C:
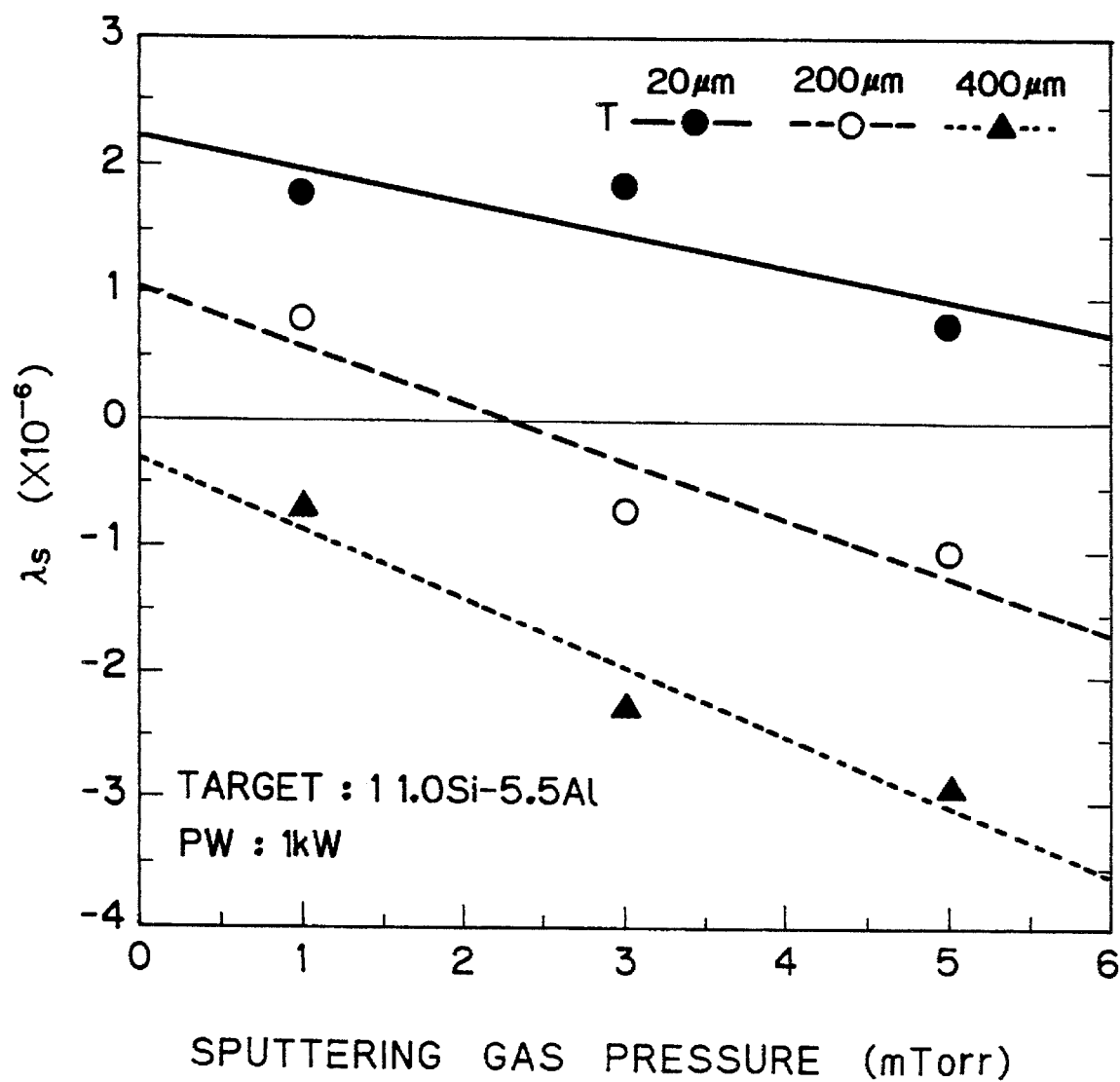
FIG. 6C is a graph showing a relationship between a sputtering gas pressure and the saturation magnetostriction of a sendust-sputtered film.

Further, the inventor recognized that the saturation magnetostriction $\lambda_s$ of each film is dependent upon a sputtering gas(Ar) pressure PR. That is, as shown in FIGS. 6A and 6B where the sputtering power PW is 1 KW, and the accumulated thickness T is 20 μm, 200 μm and 400 μm, when the sputtering gas pressure PR is increased, the Si composition and Al composition of a film deposited by sputtering is linearly or logarithmically increased. As a result, as shown in FIG. 6C, the saturation magnetostriction $\lambda_s$ of a film deposited by sputtering is linearly or logarithmically decreased due to the characteristics as shown in FIG. 2. Note that, also as shown in FIG. 2, when the saturation magnetostriction $\lambda_s$ is changed from a positive value to a negative value in the range of Al from 5 wt % to 7 wt %, this change of the saturation magnetostriction $\lambda_s$ is mainly due to the change of the Si composition. This phenomenon is shown in FIG. 7.

In summary, the inventor found that the saturation magnetostriction $\lambda_s$ of a film deposited by DC magnetron sputtering is a function of the sputtering power PW, the sputtering gas pressure PR and the accumulated thickness T of films deposited by the sputtering with respect to one sendust target. That is, the saturation magnetostriction $\lambda_s$ is calculated by:

$$\lambda_s = a_1 + a_2 \log PW + a_3 T \tag{1}$$

$$\lambda_s = b_1 + b_2 PW + b_3 T \tag{2}$$

$$\lambda_s = c_1 + c_2 \log PR + c_3 T \tag{3}$$

$$\lambda_s = d_1 + d_2 PR + d_3 T \tag{4}$$

$$\lambda_s = e_1 + e_2 \log PW + e_3 \log PR + e_4 T \tag{5}$$

$$\lambda_s = f_1 + f_2 PW + f_3 \log PR + f_4 T \tag{6}$$

$$\lambda_s = g_1 + g_2 \log PW + g_3 PR + g_4 T \tag{7}$$

$$\lambda_s = h_1 + h_2 PW + h_3 PR + h_4 T \tag{8}$$

where $a_1$, $a_2$, $a_3$, $b_1$, $b_2$, $b_3$, $c_1$, $c_2$, $c_3$, $d_1$, $d_2$, $d_3$, $e_1$, $e_2$, $e_3$, $e_4$, $f_1$, $f_2$, $f_3$, $f_4$, $g_1$, $g_2$, $g_3$, $g_4$, $h_1$, $h_2$, $h_3$, and $h_4$ are constants.

The constants in the above-mentioned equations can be determined by using a multiple regression analysis method or the like. In the case of a 11.0 wt % Si—5.5 wt % Al—bal. Fe target, the equations (1), (2), (4), (6) and (8) can be represented by:

$$\lambda_s = 1.339 + 4.072 \log PW - .008T (PR = 3 \text{ mTorr} = .4 \text{ Pa}) \tag{1'}$$

$$\lambda_s = -0.501 - 1.619 PW - .008T (PR = 3 \text{ mTorr} = .4 \text{ Pa}) \tag{2'}$$

$$\lambda_s = 2.803 - 0.431 PR - .009T (PW = 1 \text{ KW}) \tag{4'}$$

$$\lambda_s = 2.642 + 4.020 \log PW - .431 PR - .008T \tag{6'}$$

$$\lambda_s = 0.994 + 1.517 PW - .431 PR - .008T \tag{8'}$$

The other equations can be exemplified in the same way.

Figure 8:
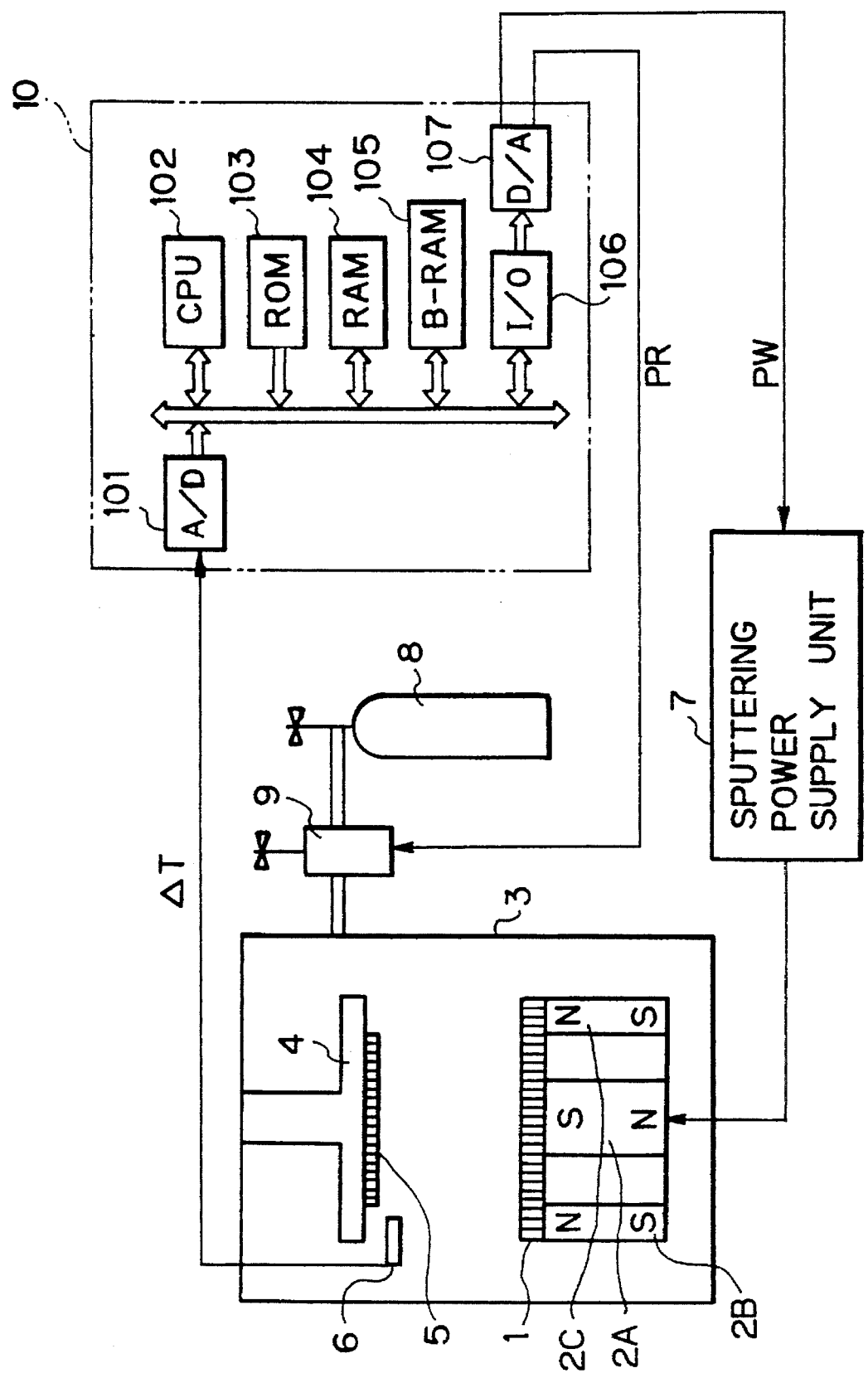
FIG. 8 is a diagram illustrating a sputtering apparatus to which the present invention is applied.

In FIG. 8, which illustrates a DC magnetron sputtering apparatus for carrying out the present invention, reference numeral 3 designates a chamber in which the target 1 and the permanent magnets 2A, 2B and 2C for mounting the target 1 thereon are provided, Also provided in the chamber 3 is an electrode 4 for mounting a substrate 5 thereon. Further, reference numeral 6 designates a sensor for measuring a thickness ΔT of a film deposited on the substrate 5 by the DC magnetron sputtering. The thickness data ΔT is supplied to an analog/digital (A/D) converter 101 of a control circuit 10, Further, reference numeral 7 designates a sputtering power supply unit for receiving a voltage defined by data PW from the control circuit 10 to supply a sputtering power corresponding to the value of the data PW to the target 1. Also, reference numeral 8 designates a steel bottle for storing Ar gas which is supplied via a gas stream control unit 9 to the chamber 3. The gas stream control unit 9 receives a voltage defined by gas pressure data PR from the control circuit 10 to control the stream of gas through the unit 9, thereby controlling the pressure of Ar gas within the chamber 3. The control circuit 10 is constructed by a microcomputer which includes a central processing unit (CPU) 102, a read-only memory (ROM) 103 for storing programs and fixed data, a random access memory (RAM) 104 for storing temporary data, a backup RAM 105 whose content is not erased even when its power supply is turned OFF, an input/output (I/O) interface 106, a digital/analog (D/A) converter 107 incorporating a demultiplexer, and the like. The D/A converter 107 supplies voltages corresponding to data PW and PR to the sputtering power supply unit 7 and the gas stream control unit 9, respectively.

The operation of the control circuit 10 will be explained with reference to FIGS. 9 and 10.

Figure 9:
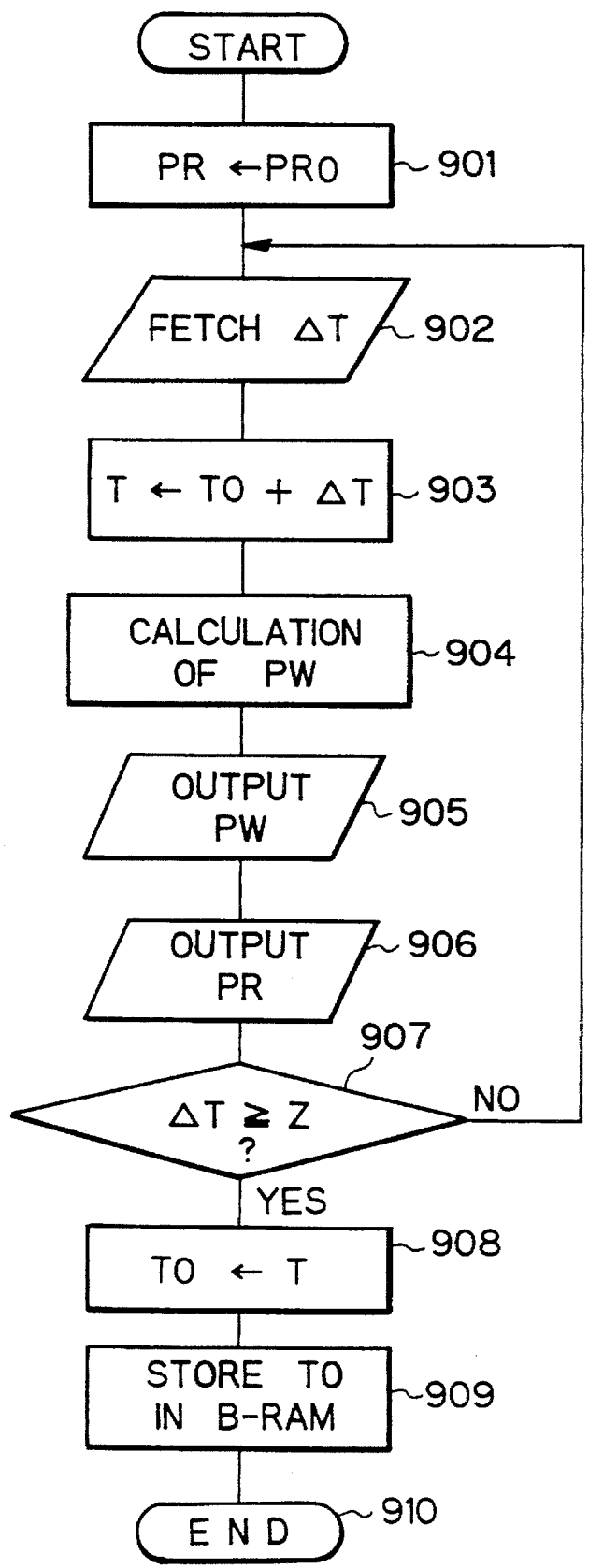
FIG. 9 and 10 are flowcharts for explaining the operation of the control circuit of FIG. 8.

In FIG. 9, the sputtering power PW is changed in accordance with accumulated thickness T. Note that a previous accumulated thickness TO is stored in the backup RAM 105, and is cleared every time a new target is mounted in the chamber 3. At step 901, a predetermined value PRO such as 3 mTorr is set as the sputtering gas pressure PR. At step 902, an A/D conversion is performed upon a thickness $\Delta T$ of a film deposited on the substrate 5 sensed by the sensor 6. Then, at step 903, the accumulated thickness TO is read out of the backup RAM 105, and a current accumulated thickness T is calculated by $$T \leftarrow TO + \Delta T$$

At step 904, a sputtering power PW is calculated by using one of the above-mentioned equations (1), (2), (5), (6), (7) and (8). Then, at step 905, the calculated sputtering power PW is supplied via the I/O interface 106 and the D/A converter 107 to the splittering power supply unit 7, thereby controlling the sputtering power at a value corresponding to the data PW.

Also, at step 906, the sputtering gas pressure PR is supplied via the I/O interface 106 and the D/A converter 107 to the gas stream control unit 9, thereby controlling the sputtering gas pressure at a value corresponding to the data PR.

Then, at step 907, it is determined whether or not the sensed thickness $\Delta T$ reaches a predetermined value Z such as 5 µm for every substrate 5. If $\Delta T \geq Z$, then the control proceeds to step 908 which renews the accumulated thickness TO by the current accumulated thickness T. The value TO is stored in the backup RAM 105 by step 909. Otherwise, the control proceeds to step 902, to thereby repeat the above-mentioned process.

The routine of FIG. 9 is completed in step 910.

Figure 10:
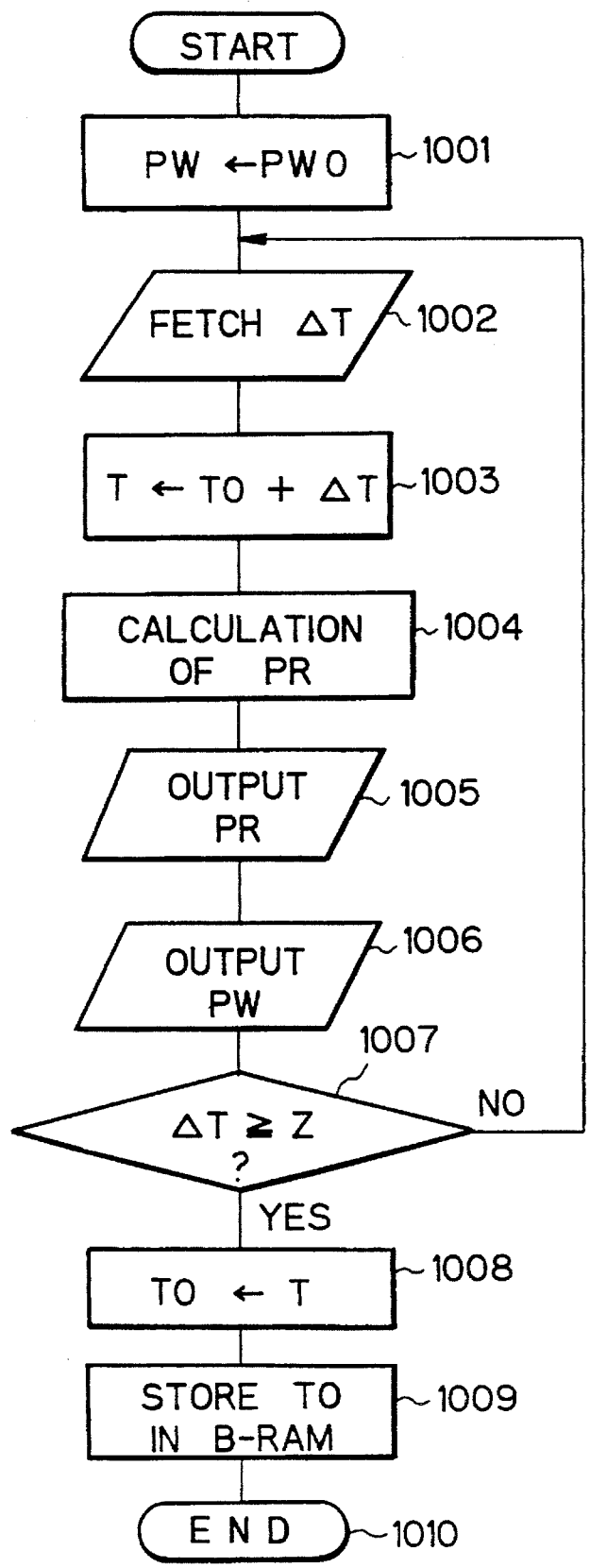

In FIG. 10, the sputtering gas pressure PR is changed in accordance with accumulated thickness T. Also, in this case note that a previous accumulated thickness TO is stored in the backup RAM 105, and is cleared every time a new target is mounted in the chamber 3. At step 1001, a predetermined value PWO such as 1 KW is set as the sputtering power PW. At step 1002, an A/D conversion is performed upon a thickness $\Delta T$ of a film deposited on the substrate 5 sensed by the sensor 6. Then, at step 1003, the accumulated thickness TO is read out of the backup RAM 105, and a current accumulated thickness T is calculated by $$T \leftarrow TO + \Delta T$$

At step 1004, a sputtering gas pressure PR is calculated by using one of the above-mentioned equations (3), (4), (5), (6), (7) and (8). Then, at step 1005, the calculated sputtering gas pressure PR is supplied via the I/O interface 106 and the D/A converter 107 to the gas stream control unit 9, thereby controlling the sputtering gas pressure at a value corresponding to the data PR.

Also, at step 1006, the sputtering power PW is supplied via the I/O interface 106 and the D/A converter 107 to the sputtering power supply unit 7, thereby controlling the sputtering power to a value corresponding to the data PW.

Then, at step 1007, it is determined whether or not the sensed thickness $\Delta T$ reaches a predetermined value Z such as 5 µm for every substrate 5. If $\Delta T \geq Z$, then the control proceeds to step 1008 which renews the accumulated thickness TO by the current accumulated thickness T. The value TO is stored in the backup RAM 105 by step 1009. Otherwise, the control proceeds to step 1002, to thereby repeated the above-mentioned process.

The routine of FIG. 10 is completed by step 1010.

Figure 11:
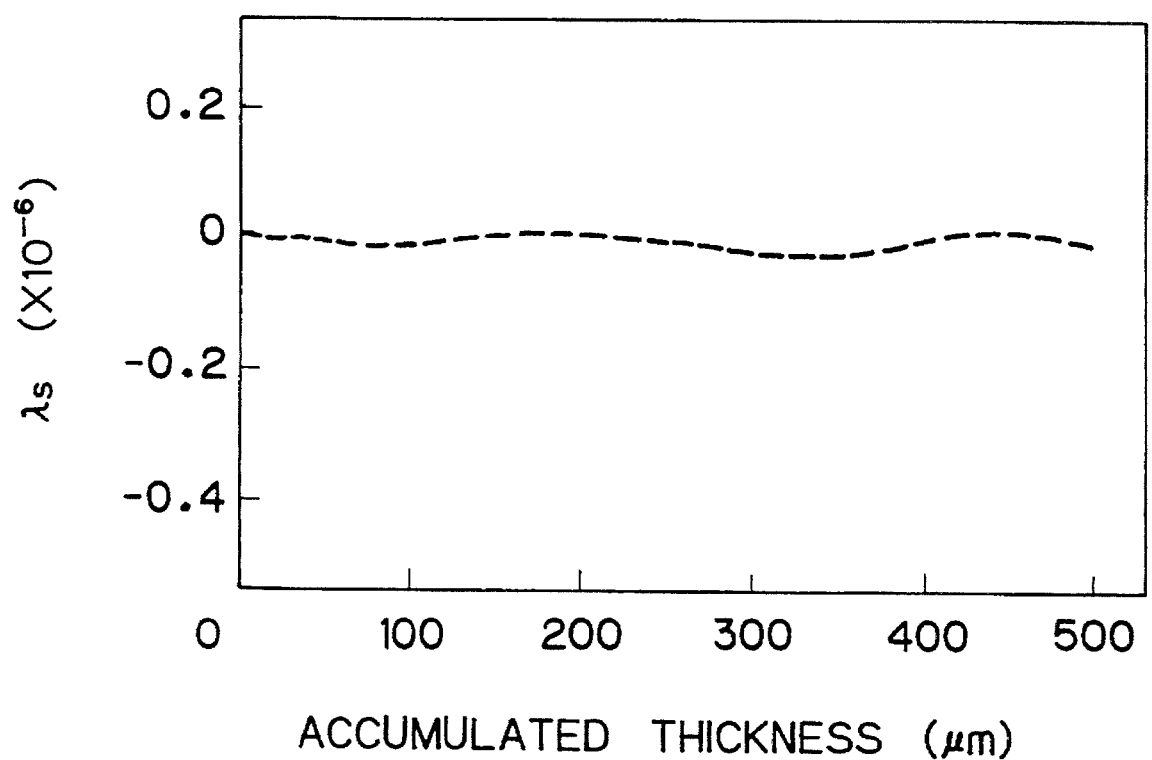
FIGS. 11 is a graph showing a relationship between an accumulated thickness of sendust-sputtered films and the saturation magnetostriction of the sendust-sputtered films according to the present invention.

Actually, as shown in FIG. 11, the obtained saturation magnetostriction $\lambda_s$ by using the routine of FIG. 9 based upon the equation (1)' was a definite value such as $0 \times 10^{-6}$ during the entire period of use of one sendust target whose original thickness is 5 mm. Note that this sendust target is locally eroded and penetrated by DC magnetron sputtering, so that a maximum accumulated thickness is about 500 µm.

Although a Fe—Si—Al alloy (sendust) is exemplified in the above-mentioned embodiments, the present invention can be applied to other alloy targets such as a Ru-and/or Ti-loaded sendust.

Figure 12:
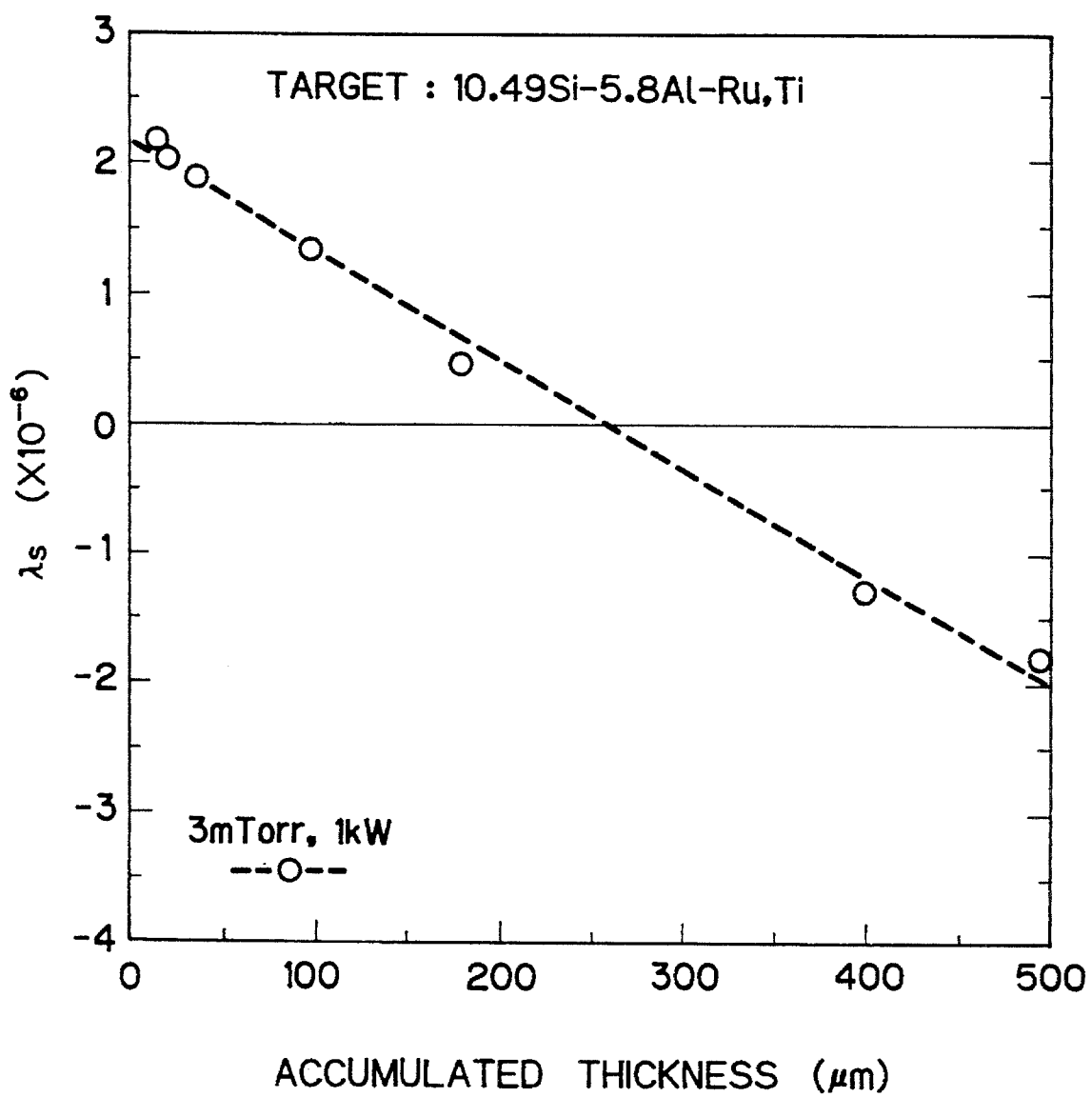
FIG. 12 is a graph showing a relationship between an accumulated thickness of sendust-sputtered films and the saturation magnetostriction of a Ru-and Ti-loaded sendust-sputtered film.
Figure 13:
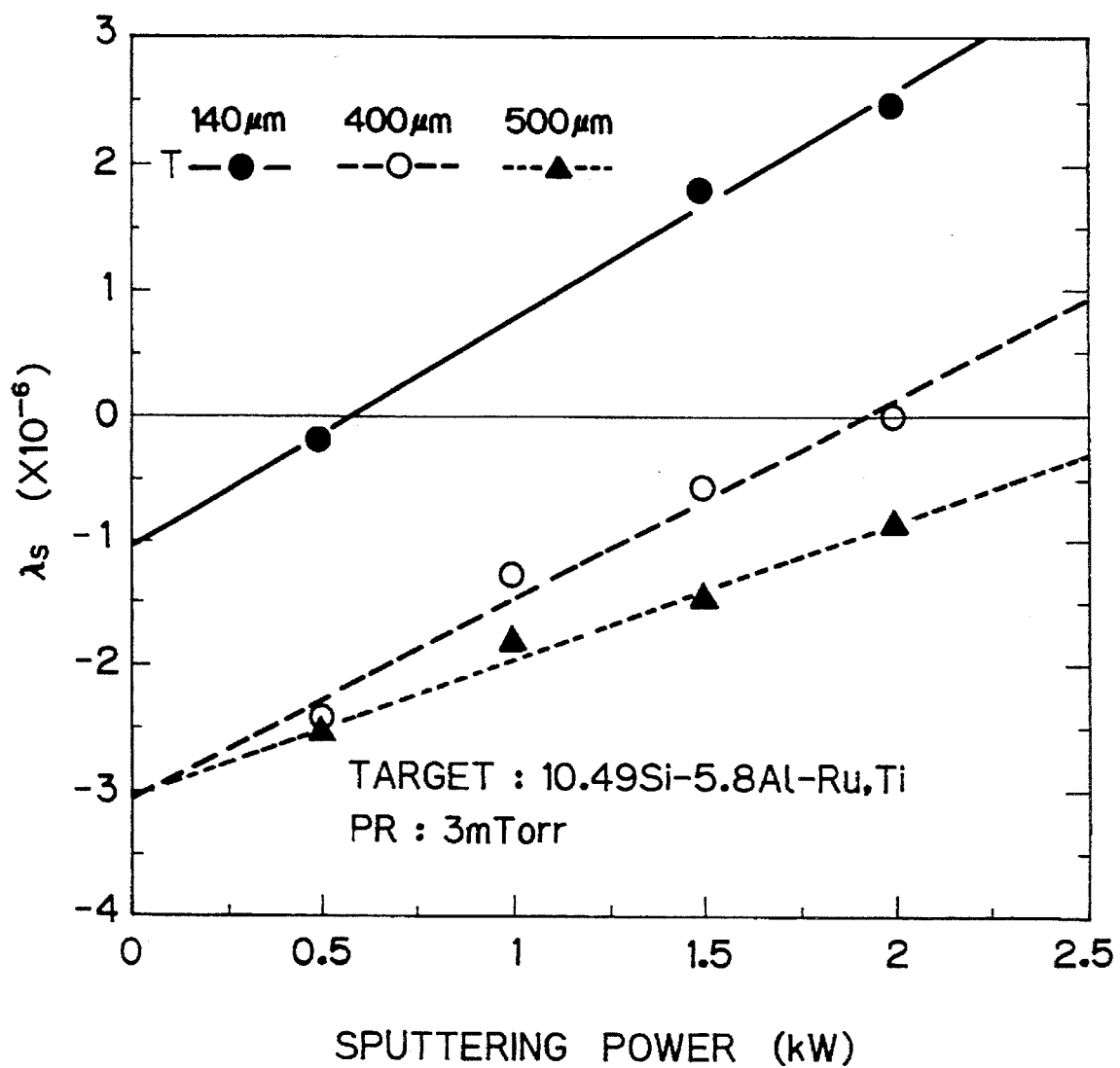
FIG. 13 is a graph showing a relationship between a sputtering power and the saturation magnetostriction of a Ru-and Ti-loaded sendust-sputtered film.

In the case of a 10.49 wt % Si—5.8 wt % Al—1 w %(Ru, Ti)—bal. Fe target, the saturation magnetostriction $\lambda_s$ of a film deposited by sputtering is also dependent upon the accumulated thickness of Ru-and/or Ti-loaded sendust sputtered films and the sputtering power PW as shown in FIGS. 12 and 13. In this case, the above-mentioned equation (1) ' is replaced by:

$$\lambda_s = 2.096 + 3.658 \log PW - .008T \quad (1)''$$

As explained hereinbefore, according to the present invention, a desired saturation magnetostriction $\lambda_s$ can be always obtained during a period of use of one alloy target.

I claim:

1. A method for depositing a Fe—Si—Al alloy film on a substrate having a final saturation magnetostriction by DC magnetron sputtering, comprising the steps of:

depositing the alloy film on the substrate at a first sputtering power;

measuring a thickness of the deposited alloy film;

accumulating the thickness to obtain an accumulated thickness with respect to one alloy target;

calculating a second sputtering power in accordance with an equation defining the saturation magnetostriction ($\lambda_s$) by sputtering power and accumulated thickness; and changing the first sputtering power to the calculated second sputtering power thereby obtaining the final saturation magnetostriction of the alloy film regardless of the accumulated thickness.

2. A method as set forth in claim 1, wherein the equation is $$\lambda_s = a_1 + a_2 \log PW + a_3 T$$

where $\lambda_s$ is the saturation magnetostriction of the alloy film, PW is the sputtering power, T is the accumulated thickness, and $a_1$, $a_2$ and $a_3$ are constants.

3. A method as set forth in claim 1, wherein the equation is $$\lambda_s = b_1 + b_2 PW + b_3 T$$

where $\lambda_s$ is the saturation magnetostriction of the alloy film, PW is the sputtering power, T is the accumulated thickness, and $b_1$, $b_2$ and $b_3$ are constants.

4. The method as set forth in claim 1, wherein the equation is further defined by a sputtering gas pressure.

5. A method as set forth in claim 4, wherein the equation is $$\lambda_s = e_1 + e_2 \log PW + e_3 \log PR + e_4 T$$

where $\lambda_s$ is the saturation magnetostriction of the alloy film, PW is the sputtering power, PR is the sputtering gas pressure, T is the accumulated thickness and $e_1$, $e_2$, $e_3$ and $e_4$ are constants.

6. A method set forth in claim 4, wherein the equation is $$\lambda_s = f_1 + f_2 PW + f_3 \log PR + f_4 T$$

where $\lambda_s$ is the saturation magnetostriction of the alloy film, PW is the sputtering power, PR is the sputtering gas pressure, T is the accumulated thickness, and $f_1$, $f_2$, $f_3$ and $f_4$ are constants.

7. A method as set forth in claim 4, wherein the equation is $$\lambda_s = g_1 + g_2 \log PW + g_3 PR + g_4 T$$

where $\lambda_s$ is the saturation magnetostriction of the alloy film, PW is the sputtering power, PR is the sputtering gas pressure, T is the accumulated thickness, and $g_1$, $g_2$, $g_3$ and $g_4$ are constants.

8. A method as set forth in claim 4, wherein the equation is $$\lambda_s = h_1 + h_2 PW + h_3 PR + h_4 T$$

where $\lambda_s$ is the saturation magnetostriction of the alloy film, PW is the sputtering power, PR is the sputtering as pressure, T is the accumulated thickness and $h_1$, $h_2$, $h_3$ and $h_4$ are constants.

9. A method as set forth in claim 1, wherein said Fe—Si—Al alloy is Ru- and/or Ti-incorporated Fe—Si—Al alloy.

10. A method for depositing a Fe—Si—Al alloy film on a substrate having a final saturation magnetostriction by DC magnetron sputtering, comprising the steps of:

depositing the alloy film on the substrate at a first sputtering gas pressure;

measuring a thickness of the deposited alloy film;

accumulating the thickness to obtain an accumulated thickness with respect to one alloy target;

calculating a second sputtering gas pressure in accordance with an equation defining the saturation magnetostriction ($\lambda_s$) by sputtering gas pressure and accumulated thickness; and changing the first sputtering gas pressure to the calculated second sputtering gas pressure thereby obtaining the final saturation magnetostriction of the alloy film regardless of the accumulated thickness.

11. A method as set forth in claim 10, wherein the equation is $$\lambda_s = c_1 + c_2 \log PR + c_3 T$$

where $\lambda_s$ is the saturation magnetostriction of the alloy film, PR is the sputtering gas pressure, T is the accumulated thickness and $c_1$, $c_2$ and $c_3$ are constants.

12. A method as set forth in claim 10, wherein the equation is $$\lambda_s = d_1 + d_2 PR + d_3 T$$

where $\lambda_s$ is the saturation magnetostriction of the alloy film, PR is the sputtering gas pressure, T is the accumulated thickness and $d_1$, $d_2$ and $d_3$ are constants.

13. A method as set forth in claim 10, wherein the equation is further defined by a sputtering power.

14. A method as set forth in claim 13, wherein the equation is $$\lambda_s = e_1 + e_2 \log PW + e_3 \log PR + e_4 T$$

where $\lambda_s$ is the saturation magnetostriction of the alloy film, PW is the sputtering power, PR is the sputtering gas pressure, T is the accumulated thickness, and $e_1$, $e_2$, $e_3$ and $e_4$ are constants.

15. A method set forth in claim 13, wherein the equation is $$\lambda_s = f_1 + f_2 PW + f_3 \log PR + f_4 T$$

where $\lambda_s$ is the saturation magnetostriction of the alloy film, PW is the sputtering power, PR is the sputtering gas pressure, T is the accumulated thickness, and $f_1$, $f_2$, $f_3$ and $f_4$ are constants.

16. A method as set forth in claim 13, wherein the equation is $$\lambda_s = g_1 + g_2 \log PW + g_3 PR + g_4 T$$

where $\lambda_s$ is the saturation magnetostriction of the alloy film, PW is the sputtering power, PR is the sputtering gas pressure, T is the accumulated thickness, and $g_1$, $g_2$, $g_3$ and $g_4$ are constants.

17. A method as set forth in claim 13, wherein the equation is $$\lambda_s = h_1 + h_2 PW + h_3 PR + h_4 T$$

where $\lambda_s$ is the saturation magnetostriction of the alloy film, PW is the sputtering power, PR is the sputtering as pressure, T is the accumulated thickness and $h_1$, $h_2$, $h_3$ and $h_4$ are constants.

18. A method as set forth in claim 10, wherein said Fe—Si—Al alloy is Ru- and/or Ti-incorporated Fe—Si—Al alloy.

19. An apparatus for depositing a Fe—Si—Al alloy film on a substrate having a final saturation magnetostriction by DC magnetron sputtering, comprising:

means for depositing the alloy film at a first sputtering power;

means for measuring a thickness of the deposited alloy film;

means for accumulating the thickness to obtain an accumulated thickness with respect to one alloy target;

means for calculating a second sputtering power in accordance with an equation defining the saturation magnetostriction ($\lambda_s$) by one of sputtering power, sputtering gas pressure, and accumulated thickness; and means for changing the first sputtering power to the second calculated sputtering power thereby obtaining the final saturation magnetostriction of the alloy film regardless of the accumulated thickness.

20. An apparatus as set forth in claim 19, wherein the equation is $$\lambda_s = a_1 + a_2 \log PW + a_3 T$$

where $\lambda_s$ is the saturation magnetostriction of the alloy film, PW is the sputtering power, T is the accumulated thickness, and $a_1$, $a_2$ and $a_3$ are constants.

21. An apparatus as set forth in claim 19, wherein the equation is $$\lambda_s = b_1 + b_2 PW + b_3 T$$

where $\lambda_s$ is the saturation magnetostriction of the alloy film, PW is the sputtering power, T is the accumulated thickness, and $b_1$, $b_2$ and $b_3$ are constants.

22. An apparatus as set forth in claim 19, wherein the equation is further defined by a sputtering gas pressure.

23. An apparatus as set forth in claim 22, wherein the equation is $$\lambda_s = e_1 + e_2 \log PW + e_3 \log PR + e_4 T$$

where $\lambda_s$ is the saturation magnetostriction of the alloy film, PW is the sputtering power, PR is the sputtering gas pressure, T is the accumulated thickness, and $e_1$, $e_2$, $e_3$ and $e_4$ are constants.

24. An apparatus as set forth in claim 22, wherein the equation is $$\lambda_s = f_1 + f_2 PW + f_3 \log PR + f_4 T$$

where $\lambda_s$ is the saturation magnetostriction of the alloy film, PW is the sputtering power, PR is the sputtering gas pressure, T is the accumulated thickness, and $f_1$, $f_2$, $f_3$ and $f_4$ are constants.

25. An apparatus as set forth in claim 22, wherein the equation is $$\lambda_s = g_1 + g_2 \log PW + g_3 PR + g_4 T$$

where $\lambda_s$ is the saturation magnetostriction of the alloy film, PW is the sputtering power, PR is the sputtering gas pressure, T is the accumulated thickness, and $g_1$, $g_2$, $g_3$ and $g_4$ are constants.

26. An apparatus as set forth in claim 22, wherein the equation is $$\lambda_s = h_1 + h_2 PW + h_3 PR + h_4 T$$

where $\lambda_s$ is the saturation magnetostriction of the alloy film, PW is the sputtering power, PR is the sputtering as pressure, T is the accumulated thickness and $h_1$, $h_2$, $h_3$ and $h_4$ are constants.

27. A method as set forth in claim 19, wherein said Fe—Si—Al alloy is Ru- and/or Ti-incorporated Fe—Si—Al alloy.

28. An apparatus for depositing a Fe—Si—Al alloy film on a substrate having a final saturation magnetostriction by DC magnetron sputtering, comprising:

means for depositing the alloy film at a first sputtering gas pressure;

means for measuring a thickness of the deposited alloy film;

means for accumulating the thickness to obtain an accumulated thickness with respect to one alloy target;

means for calculating a second sputtering gas pressure in accordance with an equation defining the saturation magnetostriction ($\lambda_s$) by one of sputtering power, sputtering gas pressure, and accumulated thickness; and means for changing the first sputtering gas pressure to the second calculated sputtering gas pressure thereby obtaining the final saturation magnetostriction of the alloy film regardless of the accumulated thickness.

29. As apparatus as set forth in claim 28, wherein the equation is $$\lambda_s = c_1 + c_2 \log PR + c_3 T$$

where $\lambda_s$ is the saturation magnetostriction of the alloy film, PR is the sputtering gas pressure, T is the accumulated thickness and $c_1$, $c_2$ and $C_3$ are constants.

30. An apparatus as set forth in claim 28, wherein the equation is $$\lambda_s = d_1 + d_2 PR + d_3 T$$

where $\lambda_s$ is the saturation magnetostriction of the alloy film, PR is the sputtering gas pressure, T is the accumulated thickness and $d_1$, $d_2$ and $d_3$ are constants.

31. An apparatus as set forth in claim 28, wherein the equation is further defined by a sputtering power.

32. An apparatus as set forth in claim 31, wherein the equation is $$\lambda_s = e_1 + e_2 \log PW + e_3 \log PR + e_4 T$$

where $\lambda_s$ is the saturation magnetostriction of the alloy film, PW is the sputtering power, PR is the sputtering gas pressure, T is the accumulated thickness, and $e_1$, $e_2$, $e_3$ and $e_4$ are constants.

33. An apparatus as set forth in claim 31, wherein the equation is $$\lambda_s = f_1 + f_2 PW + f_3 \log PR + f_4 T$$

where $\lambda_s$ is the saturation magnetostriction of the alloy film, PW is the sputtering power, PR is the sputtering gas pressure, T is the accumulated thickness, and $f_1$, $f_2$, $f_3$ and $f_4$ are constants.

34. An apparatus as set forth in claim 31, wherein the equation is $$\lambda_s = g_1 + g_2 \log PW + g_3 PR + g_4 T$$

where $\lambda_s$ is the saturation magnetostriction of the alloy film, PW is the sputtering power, PR is the sputtering gas pressure, T is the accumulated thickness, and $g_1$, $g_2$, $g_3$ and $g_4$ are constants.

35. An apparatus as set forth in claim 31, wherein the equation is $$\lambda_s = h_1 + h_2 PW + h_3 PR + h_4 T$$

where $\lambda_s$ is the saturation magnetostriction of the alloy film, PW is the sputtering power, PR is the sputtering as pressure, T is the accumulated thickness and $h_1$, $h_2$, $h_3$ and $h_4$ are constants.

36. An apparatus as set forth in claim 28, wherein said Fe—Si—Al alloy is Ru- and/or Ti-incorporated Fe—Si—Al alloy.

* * * * *